US008671731B2

(12) United States Patent
Latifi et al.

(10) Patent No.: US 8,671,731 B2

(45) Date of Patent: Mar. 18, 2014

(54) PROGRESSIVELY STAMPED CLIP-ON NOISE DAMPING SHIM FOR FRICTION ASSEMBLY, AND METHOD AND APPARATUS FOR PRODUCING CLIP-ON NOISE DAMPING SHIM

(75) Inventors: M. Reza Latifi, Concord (CA); Jerzy Kryspin, Concord (CA)

(73) Assignee: Util Canada Limited (CA)

( * ) Notice: Subject to any disclaimer, the term of this patent is extended or adjusted under 35 U.S.C. 154(b) by 762 days.

(21) Appl. No.: 12/847,384

(22) Filed: Jul. 30, 2010

(65) Prior Publication Data

US 2011/0180359 A1 Jul. 28, 2011

(30) Foreign Application Priority Data

Jan. 28, 2010 (CA) .................................... 2691388

(51) Int. Cl.

*B21D 31/06* (2006.01)
*B21D 13/02* (2006.01)
*B21D 28/10* (2006.01)

(52) U.S. Cl.

USPC .............................. 72/379.2; 72/339; 72/386

(58) Field of Classification Search

USPC ........................ 72/379.2, 380, 386, 185, 339
See application file for complete search history.

(56) References Cited

U.S. PATENT DOCUMENTS 2,626,454 A * 1/1953 Richardson ................. 72/379.2
5,247,825 A * 9/1993 Erickson ........................ 72/339
5,820,326 A * 10/1998 Melson .......................... 72/387
6,170,620 B1 * 1/2001 Akita et al. ............... 188/251 A
7,097,008 B2 8/2006 Pham et al. .................. 188/250

* cited by examiner

*Primary Examiner* — Shelley Self
*Assistant Examiner* — Pradeep C Battula
(74) *Attorney, Agent, or Firm* — Hayes Soloway P.C.

(57) ABSTRACT

A noise damping shim for a friction assembly is produced by a pre-slit step and a bend and blank step. The pre-slit step forms pre-slits in a shim material at locations where tabs of a noise damping shim are to be formed. The bend and blank step bends each of the tabs at a bent angle relative to the shim material while simultaneously blanking a shim body from the shim material to produce a noise damping shim having bent tabs extending outwardly from a periphery of the shim body.

11 Claims, 4 Drawing Sheets

200
210
220
230
240
216
236
232
242
246
202
204
206
A
50
212
234
244
208

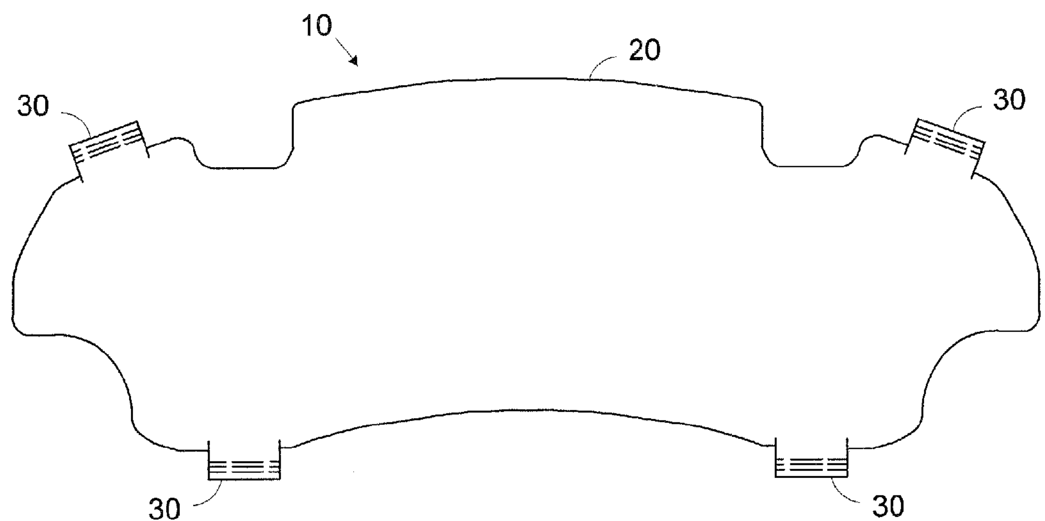
Figure 1
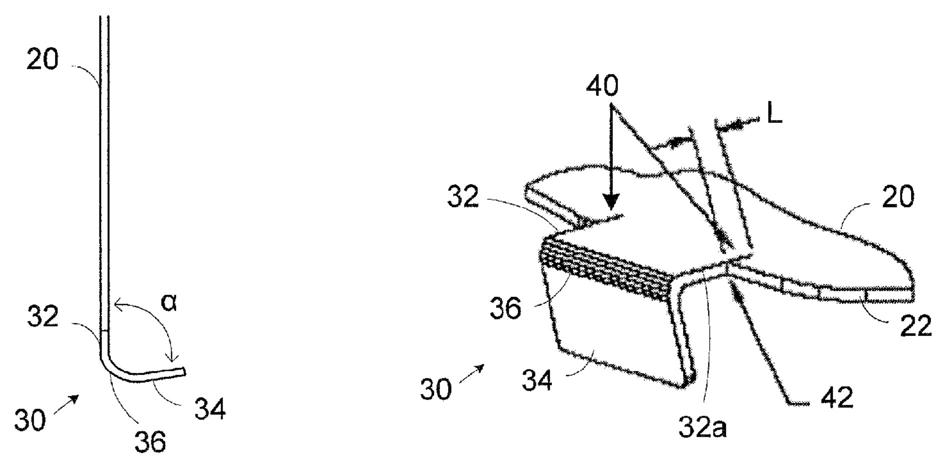
Figure 2
Figure 3

PROGRESSIVELY STAMPED CLIP-ON NOISE DAMPING SHIM FOR FRICTION ASSEMBLY, AND METHOD AND APPARATUS FOR PRODUCING CLIP-ON NOISE DAMPING SHIM

FIELD OF THE INVENTION

The present invention relates to a noise damping shim for a friction assembly, and more specifically, to a progressively stamped clip-on noise damping shim, and a method and apparatus for producing a clip-on noise damping shim.

BACKGROUND OF THE INVENTION

A typical brake system uses one or more friction assemblies. A friction assembly comprises a brake pad having a friction material mounted on a backing plate. A friction assembly is a replaceable element. For example, in a typical disc brake, a rotating disc or rotor rotates with a wheel of a vehicle. A pair of opposing friction assemblies, also referred to as brake pads, are composed of a friction surface supported by a metal backing plate and are positioned on opposite sides of the rotor such that both friction materials face to the rotor. Outside the friction assemblies are a piston and a corresponding caliper, respectively. When the brake is actuated and the piston and caliper are advanced closer to each other, the friction assemblies are pressed against the rotor between the piston and caliper. Thus, the friction materials contact the rotor to provide a stopping frictional force.

Significant forces are involved in applying the friction materials to the rotor. Due to the relative movement during the engagement of the friction materials and the rotor, squeal noise can be produced. In order to reduce the squeal noise, it is known to attach a noise damping shim to the brake pad.

A noise damping shim is typically attached to the backing plate of the brake pad using pins or staples through holes formed on the backing plate and shim. In this construction, the shim is subject to significant force between the friction assembly and the piston or caliper pushing the shim against the brake pad during the braking operation. In order to minimize movements of the shim relative to the brake pad, the pins and holes need to be precisely dimensioned.

In order to attach shim to brake pad, it is known to provide tabs or hooks projecting outwardly from the periphery of a noise damping shim. When the shim is attached to a backing plate, the bent tabs are engaged to the backing plate. This type of friction assembly is advantageous for requiring fewer operations to attach the shim compared to the friction assemblies that use pins. However, the provision of the tabs requires additional shim material.

It is therefore desirable to provide a noise damping shim and a method of producing a shim that reduces material, processing, and assembly costs.

SUMMARY OF THE INVENTION

It is an object of the invention to provide an improved noise damping shim and shim manufacturing process for a friction assembly that obviates or mitigates at least one of the disadvantages of existing systems.

The invention forms pre-slits in a shim material for forming tabs of a clip-on noise damping shim, and bends the tabs at the same time as blanking the shim body from the shim material.

In accordance with an aspect of the present invention, there is provided a noise damping shim for a friction assembly. The shim comprises a shim body that provides a noise damping function when the friction assembly is in use, the shim body having opposing surfaces and a periphery between the opposing surfaces; and one or more tabs extending outwardly from the periphery of the shim body, each tab having a base section integrally connecting the tab with the shim body, a hook section for engaging with the friction assembly backing plate, and a bent section integrally connecting the base section and the hook section at a bent angle. An intersection between the periphery of the shim body and each side edge of the base section of each tab forms a sharp corner.

In accordance with another aspect of the invention, there is provided a method of producing a noise damping shim for a friction assembly. The method comprises a pre-slit step of forming pre-slits in a shim material at locations where tabs of a noise damping shim are to be formed; and a bend and blank step of bending each of the tabs at a bent angle relative to the shim material while simultaneously blanking a shim body from the shim material to produce a noise damping shim having bent tabs extending outwardly from a periphery of the shim body.

In accordance with another aspect of the invention, there is provided a shim forming apparatus for producing a noise damping shim for a friction assembly. The apparatus comprises a pre-slit unit for forming pre-slits in a shim material at locations where tabs of a noise damping shim are to be formed; and a bend and blank unit for bending each of the tabs at a predetermined angle relative to the shim material while simultaneously blanking a shim body from the shim material to produce a noise damping shim having bent tabs extending outwardly from a periphery of the shim body.

In accordance with another aspect of the invention, there is provided a progressive stamping apparatus for producing a noise damping shim for a friction assembly. The apparatus comprises a progressive stamping die that includes an upper die and a lower die that open and close for stamping. The stamping die defines a pre-slit stage for forming pre-slits in a shim material at locations where tabs of a noise damping shim are to be formed; and a bend and blank stage for bending each of the tabs at a predetermined angle relative to the shim material while simultaneously blanking a shim body from the shim material to produce a noise damping shim having bent tabs extending outwardly from a periphery of the shim body.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 1 is a top plan view of a noise damping shim in accordance with an embodiment of the present invention;

FIG. 2 is a side view of around a tab of the noise damping shim;

FIG. 3 is an enlarged perspective view of the tab;

DETAILED DESCRIPTION OF PREFERRED EMBODIMENTS

Figure 4:
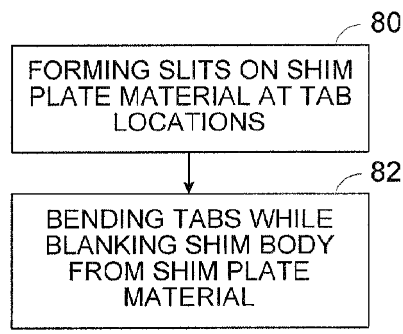
FIG. 4 is a flowchart of a method of producing a noise damping shim in accordance with an embodiment of the present invention.

Referring to FIGS. 1 to 3, a noise damping shim 10 according to an embodiment of the present invention is described. This embodiment describes a noise damping shim that is suitably clipped on a friction assembly of a disc brake for an automotive braking system. In a different embodiment, a noise damping shim of a different shape may be suitably used for a different type of a friction assembly.

The noise damping shim 10 has a shim body 20 and tabs 30. The noise damping shim 10 is clipped on a friction assembly (not shown) using the tabs 30 to provide a noise damping function when the friction assembly is in use. The shim body 20 has a predetermined shape suitable for the friction assembly. The shim body 20 typically has a generally flat shape.

Tabs 30 extend outwardly from the periphery 22 of the shim body 20. Typically, a number of tabs 30 are provided on a shim body 20 at locations that are strategically determined to minimize movements of the shim relative to the friction assembly during the use. In this embodiment, four tabs 30 are provided as shown in FIG. 1. A different embodiment may have four tabs at different locations, or a fewer or more tabs.

As shown in FIGS. 2 and 3, each tab 30 has a base section 32, a hook section 34 and a bent section 36. The base section 32 merges into the shim body 20 and integrally connects the tab 30 with the shim body 20. The hook section 34 provides engagement with the friction assembly. The bent section 36 integrally connects the base section 32 and the hook section 34 at a bent angle α, as shown in FIG. 2.

The base section 32 extends outwardly from the shim body 20 in the same plane as the plane of the shim body 20. The base section 32 of the tab 30 and the shim body 20 defines an intersection 42 between each side wall **32*a* of the base section 32 and the periphery 22 of the shim body 20. The intersection 42** forms a sharp corner, without any radius. The angle of the sharp corner is typically about 90°±30° and preferably about 90°.

There may be a slit 40 formed at the intersection 42. The slit 40 extends into the shim body 20 along the side edge **32*a* of the base section 32. The length of the slit 40 extending into the shim body 20 from the intersection 42 is short enough for maintaining the strength of the tab 30 and long enough to provide good separation of the shim material at the intersection 42 during the blanking of the shim body 20. The length of the slit 40 measured from the intersection 42** to the other end is typically between about 0 mm to 3 mm. In a different embodiment, the length of the slit may be longer, depending on the hardness and/or thickness of the shim material or other factors.

The bent angle α between the base section 32 and the hook section 34 of the tab 30 is smaller than 90° and is determined so that the multiple tabs in cooperation allow the nose damping shim 10 to be clipped on the friction assembly backing plate, and held on the backing plate by the hook sections 34 of the tabs 30 once clipped on. The bent angle α is typically between about 65° to 85°, and preferably about 75°.

The width of the tab 30 is typically about 8 mm to 15 mm, and 9.1 mm in this embodiment where the shim 10 has a length of about 134 mm and a width of about 48 mm. The outwardly extending length of the tab 30 from the intersection 42 to the bent section 36 is typically about 3 mm to 6 mm, and 3.54 mm in this embodiment. The height of the tab 30 as bent at the angle α is typically 5 mm to 8 mm, and 5.80 mm in this embodiment. The dimensions of each tab may be determined differently, depending on the type of the friction assembly backing plate on which the noise damping shim is clipped.

Figure 5:
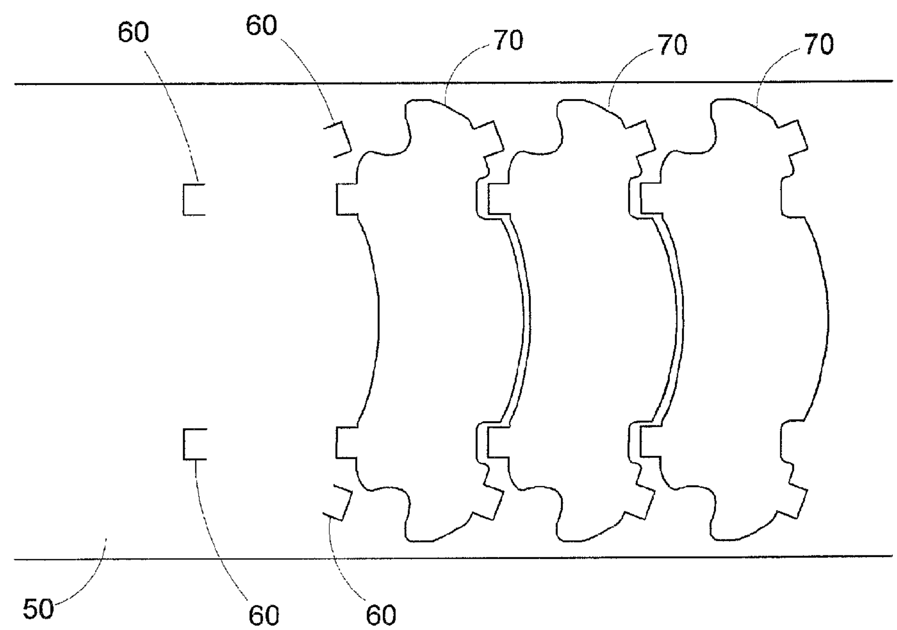
FIG. 5 is a schematic view of a shim material during the production of the noise damping shim.

Referring to FIGS. 4 and 5, a method of producing the noise damping shim 10 according to an embodiment of the present invention is now described. The method comprises step 80 of forming pre-slits 60 on a shim plate material plate 50 at the locations where the tabs are to be formed. Each pre-slit 60 defines the peripheral edge of a tab 30. Each pre-slit 60 may also define slits 40 at both ends of the per-slit 60, each slit 40 extending from the intersection of the tab 30 and the shim body 20 into the shim body 20, as shown in FIG. 3.

The next step 82 bends the tabs while simultaneously blanking the shim body from the shim material 50. Each tab is bent at a predetermined bent angle α relative to the shim material. FIG. 5 shows the holes 70 left in the shim material 50 after the shim bodies are blanked together with tabs which were pre-slit.

By forming the pre-slits for tabs in the material before blanking, the tabs can be bent at the same time of blanking the shim body. This eliminates the need for a secondary operation to bend tabs. As the result, the overall production speed can be increased, and cost associated with the production can be reduced. Also, by this method, the shim material can be efficiently used as exemplified in FIG. 5, and thus, scrap can be reduced.

Figure 6:
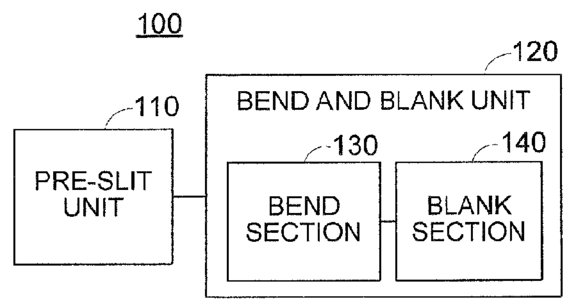
FIG. 6 is a block diagram showing a shim forming apparatus for producing a noise damping shim in accordance with an embodiment of the present application.

FIGS. 6 shows a shim forming apparatus 100 that is suitably used for producing the noise damping shim 10. The shim forming apparatus 100 has a pre-slit unit 110 and a bend and blank unit 120. The pre-slit unit 110 forms pre-slits 60 on a shim material 50 at the locations where tabs are to be formed for a noise damping shim 10. The bend and blank unit 120 has a blanking section 140 with bend sections 130 for each tab. The bend section 130 and the blank section 140 are actuated simultaneously. The bend and blank unit 120 typically has multiple bend sections 130, each corresponding to each tab. The bend sections 130 bend tabs, each at a predetermined angle α, at the same time when the blank section 140 blanks the shim body from the shim material 50. The shim material 50 is preferably used in the form of a strip and is fed progressively into the tool.

The combination of the "pre-slitting" of tabs in the shim material before blanking and the "simultaneous tab bending and shim blanking" allows production of clip-on noise damping shims in one progressive stamping tool or apparatus with minimal scrap of the shim material.

Figure 7:
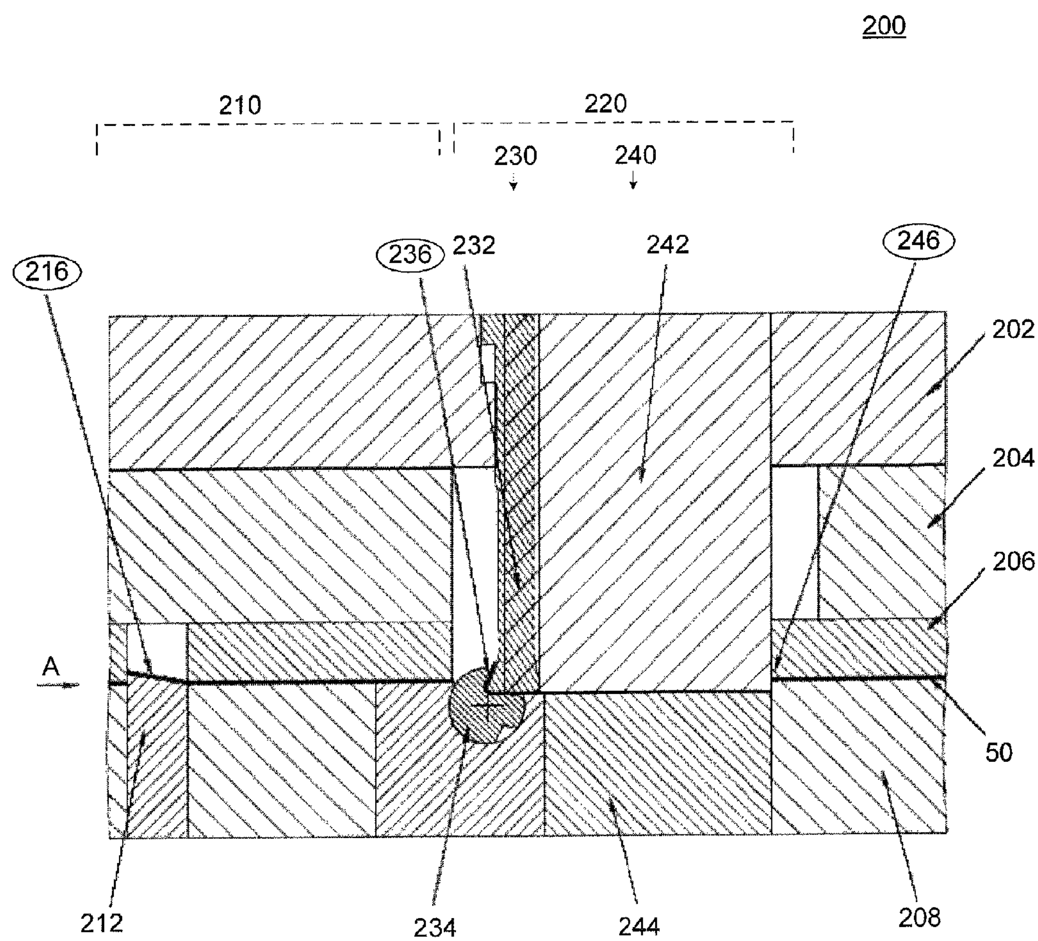
FIG. 7 is a schematic view of a progressive stamping apparatus for producing noise damping shims in accordance with an embodiment of the present application.

FIG. 7 schematically shows a cross-sectional view of a progressive stamping die of such a progressive stamping apparatus 200 in accordance with an embodiment of the present application. The progressive stamping apparatus 200 progressively stamps noise damping shims. The stamping die of the progressive stamping apparatus 200 has an upper die comprising a punch holder 202, stripper 204 and stripper window 206, and a lower die comprising a main blanking insert 208. A strip of shim material 50 is fed between the upper die and lower die. The stamping die opens and closes for stamping by moving the upper die and lower die relative to each other.

The progressive stamping apparatus 200 has a pre-slit stage 210 and a bend and blank stage 220 for progressive stamping.

The pre-slit stage 210 has slitting mechanisms, each provided at a location that corresponds to a tab to be formed for a noise damping shim. Each slitting mechanism has a slitting insert 212 provided in the main blanking insert 208. An upper cutting edge of the slitting insert 212 protrudes above the upper surface of the main blanking insert 208. The cutting edge has a shape corresponding to the peripheral edge of a tab 30. The cutting edge may also further correspond to slits 40 extending into the tab body shown in FIG. 3. The slitting insert 212 faces an opening in the stripper window 206 for forming a pre-slit 60 in the shim material 50. In a different embodiment, the pre-slit stage 210 may have a slitting mechanism that has a slitting insert with multiple cutting edges for forming multiple pre-slits 60 for multiple tabs.

The bend and blank stage 220 has bending mechanisms 230 and a blanking mechanism 240. Each bending mechanism 230 is provided at a location that corresponds to a pre-slit 60 formed by the pre-slit stage 210. Each bending mechanism 230 has a bending punch insert 232 provided in the punch holder 202, and a bending cam 234 provided in the main blanking insert 208. The bending cam 234 faces the bending punch insert 232. The blanking mechanism 240 has a main punch 242 provided in the punch holder 202, and a counter punch 244 provided in the main blanking insert 208. The counter punch 244 faces the main punch 242. The counter punch 244 may be spring loaded.

During the operation of the progressive stamping apparatus 200, the strip of shim material 50 is fed in the progressive stamping apparatus 200 in the direction shown with an arrow A in FIG. 7. The shim material 50 is progressively advanced for a predetermined distance between stamping strokes of the apparatus 220.

In the pre-slit stage 210, during a stamping stroke, as the stamping die closes, the upper cutting edge of the slitting insert 212 of each slitting mechanism penetrates the shim material 50 for slitting a pre-slit for forming a tab (216) at a section of the shim material 50.

The next progression brings this section of the shim material 50 to the bend and blanking stage 220. During a stamping stroke, in each bending mechanism 230, as the stamping die closes, the cam 234 is actuated and bends the tab in cooperation with the bending punch insert 232 (236). At the same time, the blanking mechanism 240 blanks a shim body by the main punch 242 and the counter punch 244 (246).

Figure 8:
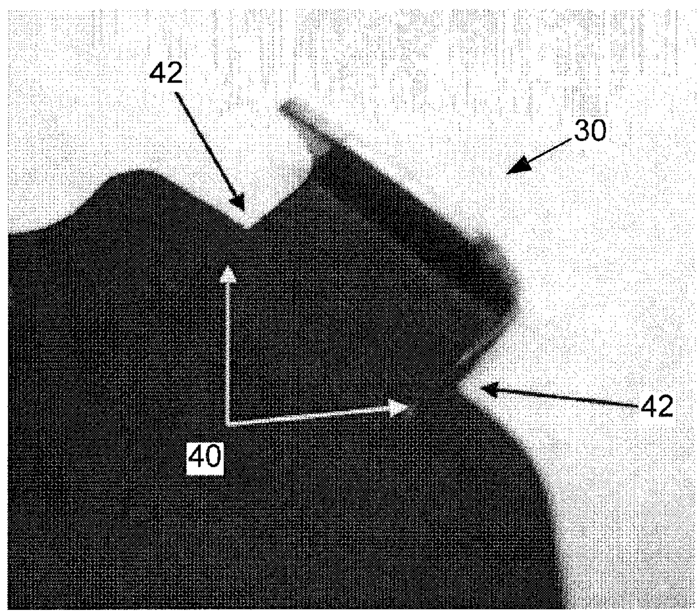
FIG. 8 shows an example of a tab of the noise damping shim.
Figure 9:
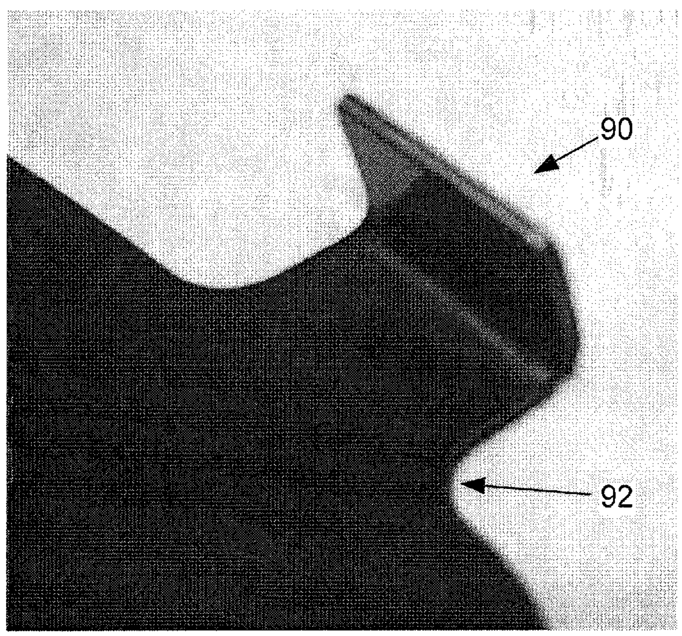
FIG. 9 shows an example of a tab of a prior art shim.

The progressive stamping apparatus 200 produces a noise damping shim having bent tabs, each bent tab having a sharp corner at each intersection of the tab and the shim body. The noise damping shim may also have remaining pre-slit sections extending into the shim body. FIG. 8 shows an example of such a noise damping shim, in which the remaining pre-slit sections 40 is visible on the finished shim, and the sharp corner 42 is formed at the intersection of the shim body and tab 30 without no radius. This is clearly contrary to a shim produced by a conventional apparatus, as shown in FIG. 9, in which the intersection of the shim body and tab 90 forms a round corner 92 with a large radius, and there is no slit between the shim body and tab 90.

The progressive stamping apparatus 200 allows production of the entire noise damping shim in a progressive stamping die, which eliminates a need of an off-line secondary tab bending operation. This results in an increased shim production speed, elimination of an off-line tab bending mechanism, and reduction of production costs.

While particular embodiments of the present invention have been shown and described, changes and modifications may be made to such embodiments without departing from the scope of the invention. For example, the progressive stamping apparatus 200 has a slitting insert provided in the lower die, but in a different embodiment, a slitting insert may be provided in the upper die. The progressive stamping apparatus 200 uses the bending cam 234. In a different embodiment, a different mechanism may be used to bend tabs.

What is claimed is:

1. A method of producing a noise damping shim for a friction assembly, the method comprising:

a pre-slit step of forming pre-slits in a shim material at locations where tabs of a noise damping shim are to be formed; and a bend and blank step of bending each of the tabs at a bent angle relative to the shim material while simultaneously blanking a shim body from the shim material to produce a noise damping shim having bent tabs extending outwardly from a periphery of the shim body, wherein the pre-slit step slits the shim material so that each pre-slit defines a peripheral edge of each tab, the peripheral edge of each tab being defined from an intersection with the periphery of the shim body to another intersection with the periphery of the shim body.

2. The method as claimed in claim 1, wherein the peripheral edge of each tab includes side edges intersecting the periphery of the shim body, and the bend and blank step blanks the shim body using the pre-slits so that the intersection between the periphery of the shim body and each side edge of the tab forms a sharp corner.

3. The method as claimed in claim 2, wherein the bend and blank step blanks the shim body to form the sharp corner having an angle that is about 60° to 120°.

4. The method as claimed in claim 3, wherein the bend and blank step blanks the shim body to form the sharp corner having the angle of about 90°.

5. The method as claimed in claim 1, wherein the peripheral edge of each tab includes side edges intersecting with the periphery of the shim body, and the pre-slit step forms the pre-slits with slit sections extending from the intersections into the shim body along the side edges of the tab.

6. The method as claimed in claim 5, wherein the pre-slit step forms the slit sections so that a length of each of the slit sections extending into the shim body is between 0 mm to 3 mm.

7. The method as claimed in claim 1, wherein the bend and blank step bends each tab at a bent section between a base section integrally connecting the tab with the shim body and a hook section for engaging a friction assembly.

8. The method as claimed in claim 7, wherein the bend and blank step bends each tab at the bent angle that is smaller than 90° so that the nose dumping shim is clipped on the friction assembly.

9. The method as claimed in claim 8, wherein the bend and blank step bends each tab at the bent angle between 65° to 85°.

10. A shim forming apparatus for producing a noise damping shim for a friction assembly, the apparatus comprising:

a pre-slit unit configured to form pre-slits in a shim material at locations where tabs of a noise damping shim are to be formed; and a bend and blank unit configured to bend each of the tabs at a predetermined angle relative to the shim material while simultaneously blanking a shim body from the shim material to produce a noise damping shim having bent tabs extending outwardly from a periphery of the shim body, wherein the pre-slit unit slits the shim material so that each pre-slit defines a peripheral edge of each tab, the peripheral edge of each tab being defined from an intersection with the periphery of the shim body to another intersection with the periphery of the shim body.

11. The shim forming apparatus as claimed in claim 10, wherein the bend and blank unit comprises:

a bend section that bends each of the tabs at a bent section between a base section integrally connecting the tab with the shim body and a hook section for engaging a friction assembly; and a blank section that blanks the shim body using the pre-slits so that an intersection between the periphery of the shim body and each side edge of the tab forms a sharp corner.

* * * * *